Aug. 15, 1933.  N. R. KRAUSE  1,922,374
CORN HARVESTING MACHINE
Filed June 29, 1931   5 Sheets-Sheet 1

INVENTOR.
NORMAN R. KRAUSE
BY James A. Walsh
ATTORNEY.

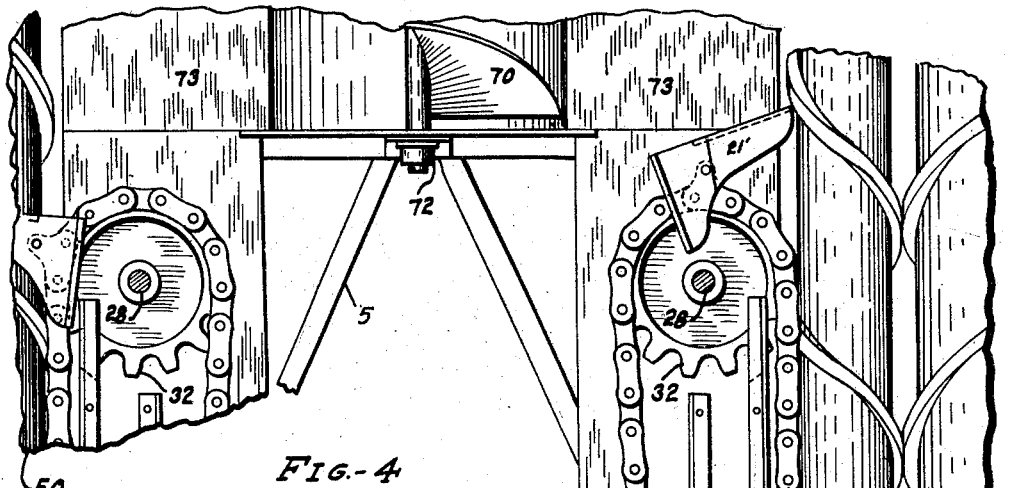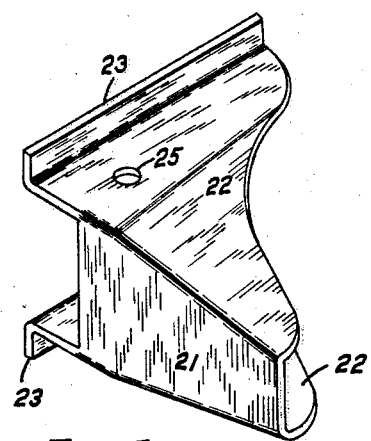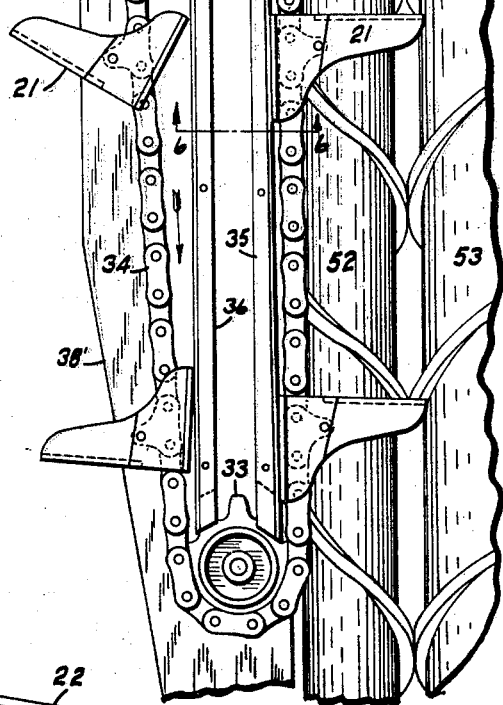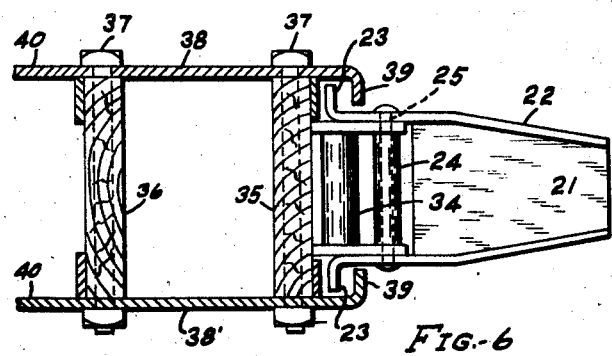

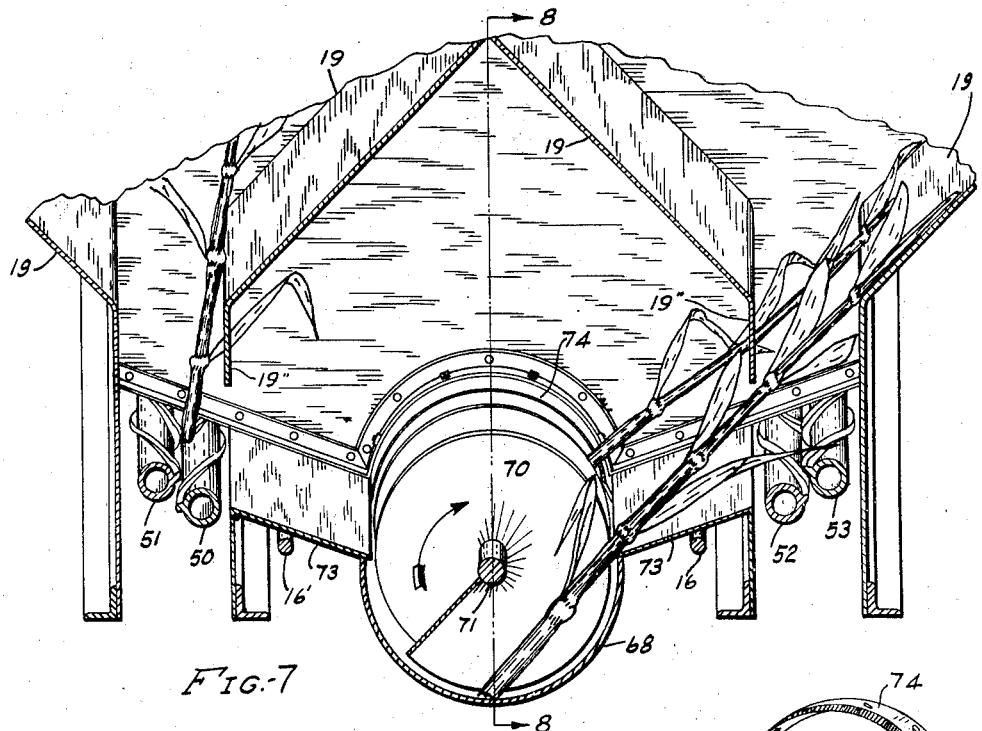
Fig. 7
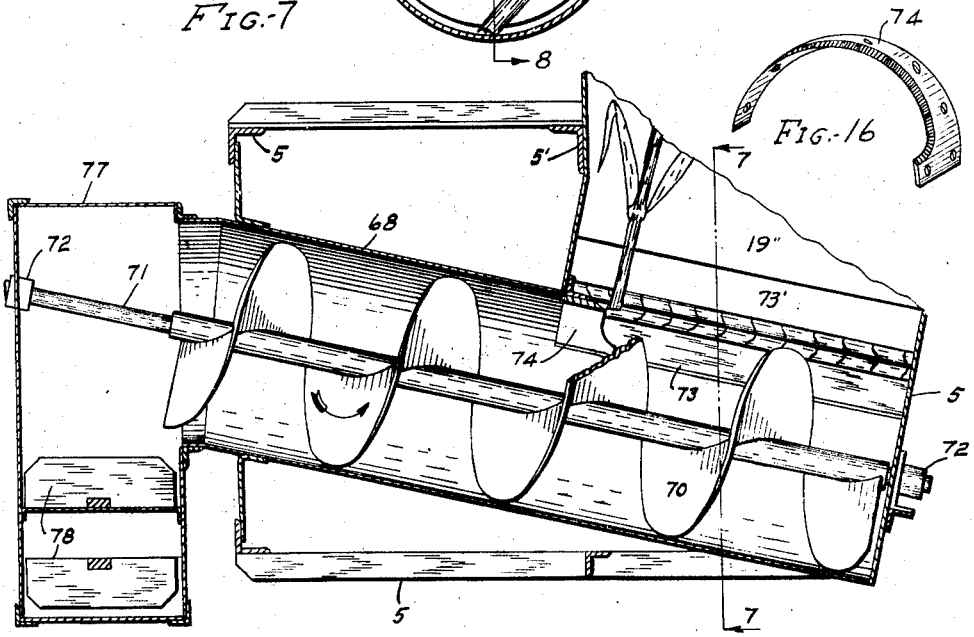
Fig. 8
Fig. 16
INVENTOR.
NORMAN R. KRAUSE
BY James A. Walsh
ATTORNEY.

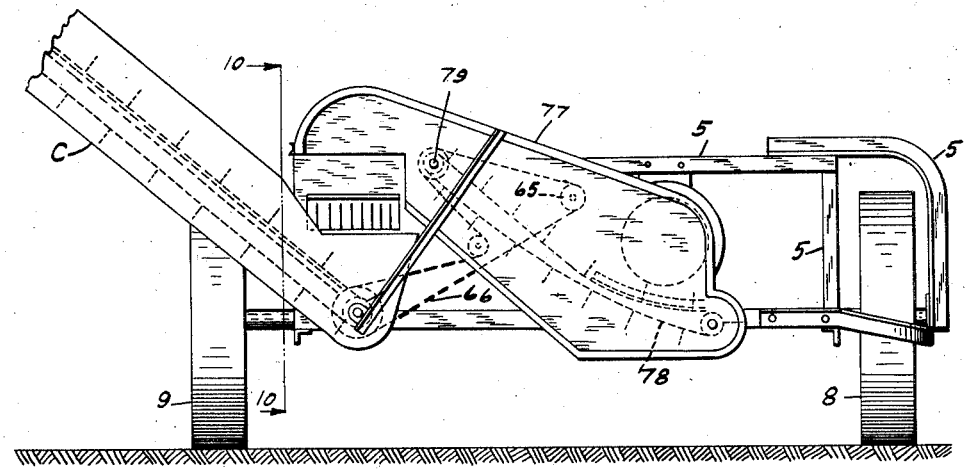
FIG.-9
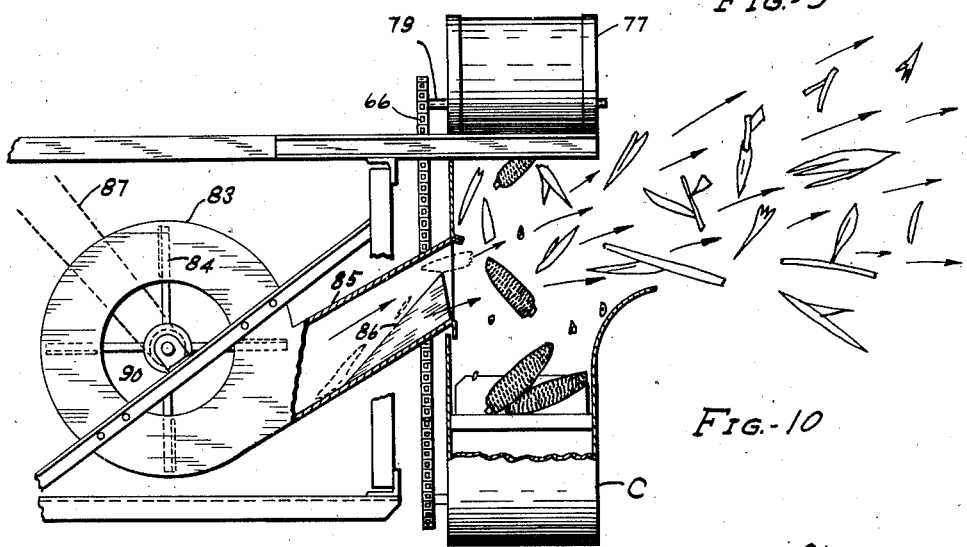
FIG.-10
FIG.-12
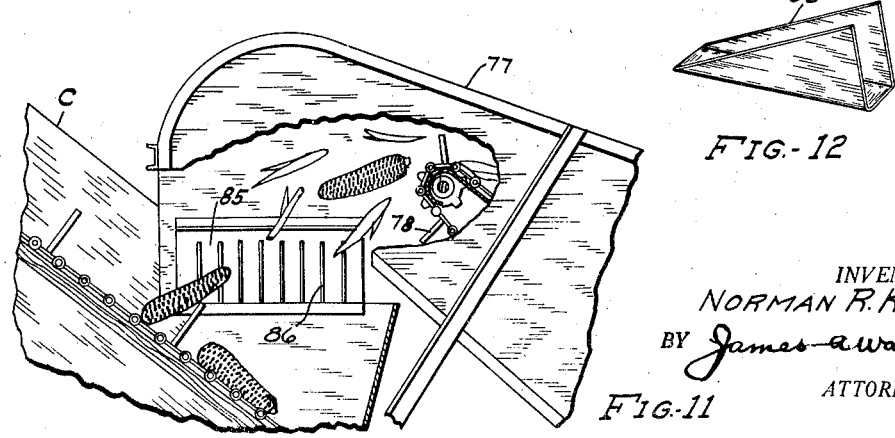
FIG.-11
INVENTOR.
NORMAN R. KRAUSE
BY James A. Walsh
ATTORNEY.

Aug. 15, 1933.  N. R. KRAUSE  1,922,374
CORN HARVESTING MACHINE
Filed June 29, 1931   5 Sheets-Sheet 5

INVENTOR.
NORMAN R. KRAUSE
BY James A. Walsh
ATTORNEY.

Patented Aug. 15, 1933

1,922,374

UNITED STATES PATENT OFFICE

1,922,374

CORN HARVESTING MACHINE

Norman R. Krause, Racine, Wis., assignor to J. I. Case Company, Racine, Wis., a Corporation Application June 29, 1931. Serial No. 547,606

23 Claims. (Cl. 56—18)

The object of my invention is to provide a tractor-operated corn harvester of the multiple row type by which the stalks are gathered, the ears picked therefrom and husked by the same rolls, broken and detached stalks cut into small portions, and the husked ears and other material conveyed from the machine to a supplemental conveyer and separated by an air blast while being discharged therefrom so that the cleaned ears may be conveyed to a source of deposit and the trash otherwise disposed of, all of which operations are conjointly performed in sequence as the machine moves through the field by co-acting devices of improved and novel construction and arrangements, as will hereinafter more fully appear.

Figures 1, 2, 3:
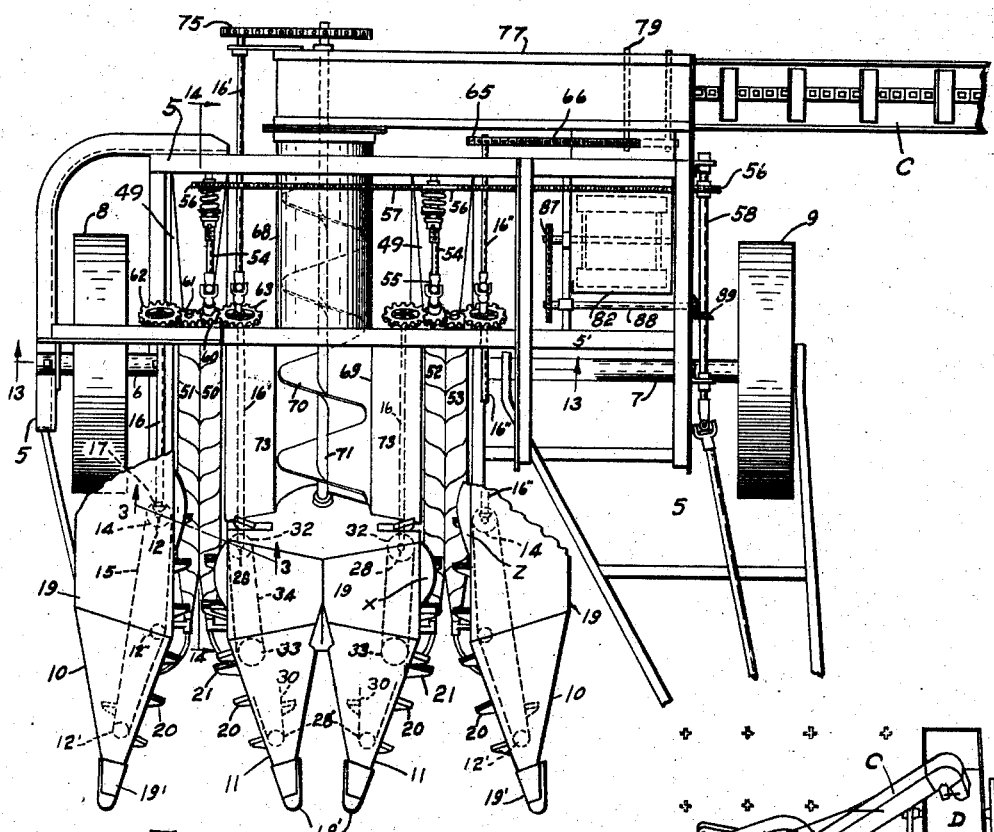
Figure 13:
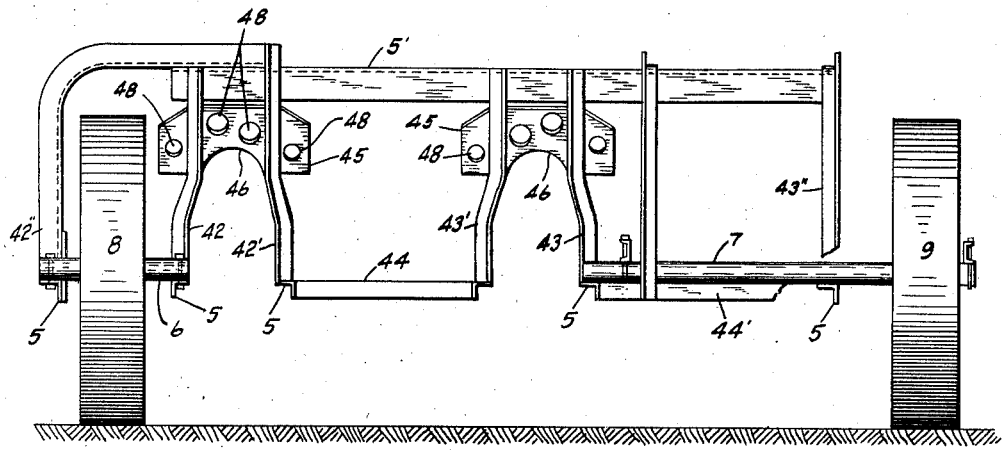
Figure 14:
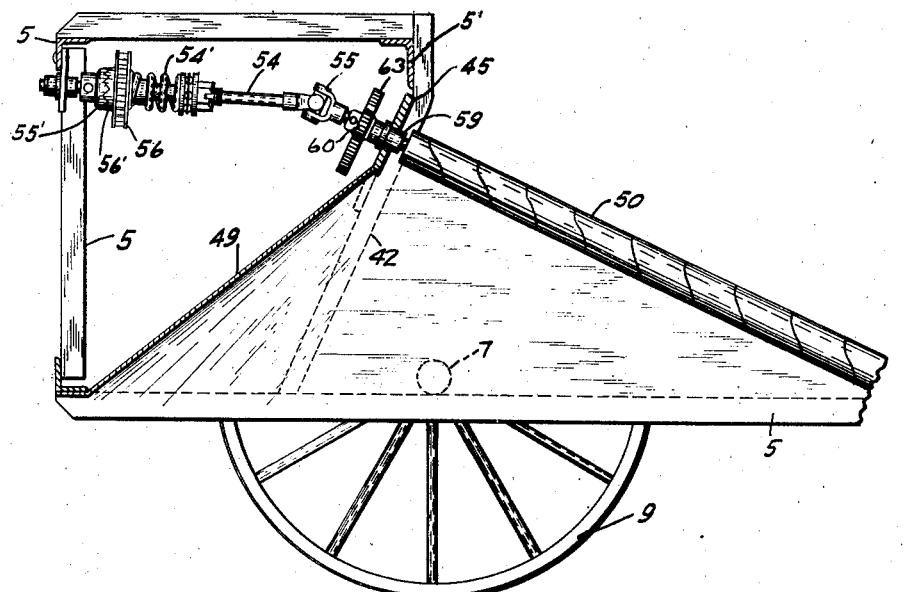
Figure 15:
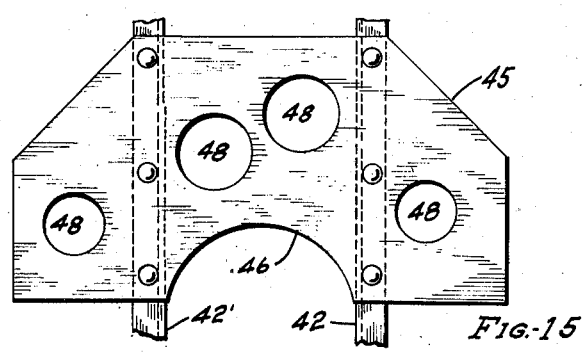

In the accompanying drawings, forming part hereof, Figure 1 is a plan view of the harvester with portions removed to more clearly disclose actuating parts of the gatherers; Fig. 2, a diagrammatic view of the harvester and a complementary tractor for drawing and operating the same, as well as a vehicle for receiving the cleaned ears of corn, and which view shows the equipment as a unit traversing the field, the light and shaded crosses indicating picked and unpicked rows of corn stalks respectively; Fig. 3, a detail section taken on the dotted lines 3—3 in Fig. 1; Fig. 4, a fragmentary plan view of a set of picking rolls and gathering chains; Fig. 5, a perspective of one of the gathering fingers; Fig. 6, a transverse sectional view taken on the dotted line 6—6 in Fig. 4 showing the manner of mounting said finger; Fig. 7, a transverse sectional view through the harvester showing the relation of the rolls to the material delivering conveyer, taken on the dotted line 7—7 in Fig. 8; Fig. 8, a longitudinal detail sectional view taken on the dotted line 8—8 in Fig. 7; Fig. 9, a rear elevation of the harvester; Fig. 10, a detail section taken on the dotted line 10—10 in Fig. 9; Fig. 11, an enlarged detail of the conveying and winnowing elements employed; Fig. 12, a perspective view of one of the gates forming part of the fan outlet shown in Fig. 10; Fig. 13, a front elevation of the axle and shaft supporting framework showing the arched stalkways included therein taken on the dotted line 13—13 in Fig. 1; Fig. 14, a fragmentary elevation showing one of the snapping rolls and the manner of mounting and driving the same, taken on the dotted line 14—14 in Fig. 1; Fig. 15, a rear elevation on an enlarged scale of a shaft supporting plate forming part of the rear frame; and Fig. 16 is a perspective of the stalk cutting knife employed in connection with the auger conveyer.

In said drawings the numeral 5 indicates a frame of appropriate design upon which to mount in a compact manner the mechanisms employed in my improvements, and 6 and 7 are axle sections upon whic' the wheels 8 and 9 are mounted for transport and whereby the gatherers may be tilted. The harvester illustrated is of the two-row type embodying two gatherers of similar construction and operation, each set comprising an outer gathering point 10 and an inner point 11 mounted in the frame 5, and as the gatherers are counterparts but one set thereof will be specifically described in all essential details. As indicated in Figs. 1 and 3, the outer point 10 is provided with a vertical shaft 12 supported in its frame 13, 13' and carries a sprocket 14 at its upper end connected by a chain 15 to a sprocket 12', said chain running about an idler 12" and driven by an inclined shaft 16 in a manner to be hereinafter described, the lower end of said shaft being provided with a bevel gear 17 engaging and rotating a similar gear 18 on the vertical shaft 12 for actuating the chain. Said chain 15 has secured thereto gathering fingers 20 of any desired construction, and the points 10 with the parts associated therewith as described, as well as the inner points 11, are covered by a shield 19 in a well known manner, the forward end of each point being equipped with a reinforced metal shoe 19'.

The inner gathering point 11 also includes a vertical shaft 28 having a sprocket 29 at its upper end as shown in Fig. 3 connected by a chain 30 to a sprocket 28', said chain having secured thereto gathering fingers 20 of a similar character to those carried by the chain 15. The lower end of shaft 28 is provided with a bevel gear 18' and is driven by an inclined shaft 16' the lower end of which carries a bevel gear 17' engaging the gear 18' of rotating shaft 28 and actuating chain 30. Said shaft 28 also carries a sprocket 32 connected to a sprocket 33 by a chain 34, Figs. 3 and 4, and which chain has connected thereto a series of gathering fingers 21 embodying a base and side walls 22 flanged at their lower sides, at 23, Fig. 5, whereby as said fingers are pivotally secured to the chain by a pin 24 passing through the holes 25, the flanges 23 and chain 34 will travel in a guide, as will now be described.

Between the chain runs, as shown in Fig. 4, I mount a divider comprising the longitudinal members 35, 36, secured at their upper and lower sides by bolts 37 or otherwise to covers or binders 38, 38', as indicated in Fig. 6, each having a flange 39 at one side while the opposite sides 40 of the covers extend horizontally beyond member 36. The cover 39 is omitted from Fig. 4 for purposes of clearness, and which view illustrates the inner point 11 of the set of gatherers at the left side of the machine as seen when looking forward from the rear end thereof. In said view it will be observed that the divider member 35 at each end extends to within the circumference of sprockets 32 and 33, and that the member 36 is somewhat shorter in length, for a purpose to appear.

Included in the main frame 5, Fig. 13, is a transverse member 5' to which is secured the vertical members 42, 42' and 43, 43', positioned rearwardly of axles 6 and 7, the members 42' and 43' being connected at their lower ends by a brace 44. To members 42, 42' I secure an inclined shaft-supporting plate 45 recessed at its lower side, at 46, and a similar support is connected to the members 43, 43', each of which plates embodies shaft-bearing supports as 48. Adjacent member 42 an outer member 42" is secured to the frame 5', and adjacent member 43 the member 43" is secured to said frame 5' and connected at their lower ends by a brace 44', these outer members at each side of the machine being positioned rearwardly of the axles and reinforce the main frame for supporting the wheels 8 and 9 respectively; and extending rearwardly from each of the plates 45 and the vertical members associated therewith is a sheet metal stalk deflector 49, Fig. 14, which is arched and inclines downwardly and secured to the frame 5, thus constituting a covered passageway for the stalks. By employing the stub axles 6, 7, and the arched vertical members 42, 42', and 43, 43', in the manner described I provide open stalkways in connection with the frame, thus dispensing with a continuous axle or other cross-member and avoiding obstructions to the stalkways and deflectors 49 when passing astride standing stalks.

As clearly shown in Figure 1, two pairs of snapping and husking rolls are employed, as 50, 51, and 52, 53, each of the inner rolls of the sets being rotated in like manner through a shaft 54, flexibly connected, at 55, Fig. 14, to its roll, as 50, 52, and is driven through a sprocket-and-chain system 56, 57, connected to a power take-off shaft 58 which extends to and is actuated by a tractor A, Fig. 2. The roll is suitably mounted in a bearing 59 in plate 45, and is provided with a pinion 60 engaging a pinion 61 on roll 51 for rotating the latter, which pinion 61 in turn engages a gear 62 for rotating shaft 16 and consequently shaft 12, Fig. 3, to actuate chain 15, and also said pinion 60 engages a gear 63 on shaft 16' for actuating the chains 30 and 34. The chain driving shafts 16 and 16" associated with the opposite set of rolls 52, 53, are actuated by a gear system similar to that described respecting shafts 16, 16' and rolls 50, 51, and are simultaneously rotated therewith through the shafts 54 and sprocket-and-chain system 56, 57; and the shaft 16", like shaft 16', has a rear extension connected by a sprocket-and-chain system 65, 66, Figs. 1 and 9, for operating a conveyer to be further described. Between the two sets of combined snapping and husking rolls, the outer ones 51 and 53 of which are positioned higher than the inner rolls as indicated in Fig. 7, I mount an auger casing 68 having a portion of its upper side open, as at 69, in which casing I provide an auger 70, its shaft 71 being seated in bearings 72 in parts of the frame 5, as shown in Fig. 8, and at each side of the auger housing inclined deflectors 73 are included between it and the inner rolls 50, 52, said housing at approximately the rear or upper ends of the rolls having a cutting instrumentality associated therewith, as a semi-circular knife 74, Figs. 7, 8 and 16, the rear portion of the auger being enclosed by the housing and mounted in the machine frame as stated, and the rear end of the auger shaft 71 is connected by a sprocket-and-chain system 75 to the rear extension of shaft 16' so that upon rotation of shaft 54 of roll 50 said shaft 16' through gears 60, 63 will drive the sprocket-and-chain system 75 to rotate the auger 70.

The rear end of the auger casing 68 communicates with housing 77 and is arranged to discharge onto an endless carrier 78 therein of well known construction, and which carrier is operated by the sprocket-and-chain system 66 connected to its upper roll shaft 79, as indicated in Figs. 1 and 9, and by which carrier material discharged by the auger is conveyed to an elevator or wagon loader C for discharging husked and cleaned ear corn into a vehicle D, the elevator being actuated by the chain drive 66 from shaft 16", indicated in Figs. 1 and 10. By reference to Fig. 2, illustrating the assemblage of the corn harvester equipment, it will be noted that the tractor A, harvester B and vehicle D are connected and arranged in relation to each other to travel the fields as a unit, and that the elevator C is so positioned as to discharge the ear corn into a vehicle which when filled, as will be understood, may be readily detached from the harvester and substituted by a vehicle to be filled so that the harvesting operations can be continued without undue delay.

In one side of the frame I mount a winnowing fan 82, Fig. 1, of well known construction, including, as shown in Fig. 10, a casing 83, rotating wings 84, and an outlet 85 having inclined gates 86 therein, said fan being rotated by a chain drive 87, Fig. 1, actuated by a shaft 88 geared to and driven, at 89, by the power take-off shaft 58, said fan withdrawing air from the exterior through the side openings in its casing, as 90, and discharging its blast through and winnowing material issuing from the carrier 78 in the conveyor housing 77 or otherwise.

In Fig. 2 the harvester B and complementary equipment are diagrammatically illustrated as at harvesting operations in a corn field, the crosses in dotted lines indicating corn stalks from which the ears have been picked, and the tractor A astride a row, its wheels traveling between the rows, while the crosses in full lines indicate stalks from which the ears are about to be picked, each of the pairs of gatherers being astride a row in the position occupied when picking two rows and the harvested crop discharging through the elevator C into vehicle D, which latter is traversing the picked rows in a manner similar to the tractor. As the harvester advances the stalks are guided between the outer and inner points 10, 11, and gathered by the fingers 20, 21, so that the rotating rolls will pass astride the stalks and snap the ears therefrom, at the same time removing the husks from the ears, which roll or fall down the inclined deflectors 73 into the open casing 69, and are augered or propelled through the casing by the flights 70, during which operation, as indicated in Figs. 7 and 8, broken and detached stalks and leaves gathered by the fingers and rolls also pass into the auger, and, as the stalks are carried rearwardly in leaning or substantially upright position by the flights to the knife 74, they are cut piece by piece thereby into appropriate lengths to fall and be confined between the flights and augered through the casing with the husked ears and leaves, it being understood that the rolls 50, 51, and 52, 53, are of a character to function both as combination snapping and husking rolls adapted to snap or pick the ears from the stalks and remove the husks from the ears. In Fig. 1 it will be observed that the gathering fingers 20 travel but a short distance in relation to the forward portions of the rolls and as they turn about their respective rear sprockets 14 and 29 during the gathering action they are assisted by the lower moving fingers 21 carried by the chain 34, Fig. 4, through the guide-way described and as shown in Fig. 6. The converging gathering points, as will be understood, gradually compress the stalk masses and guide them into the converging rolls, as 52, 53, and as the strippers $x$ and $z$ engage the stalks the latter are forced inwardly to the stalkway between the rolls, by which action the chain fingers are released from engagement with the stalks so that they disappear under the strippers and pass around their respective sprockets. It is essential that these lower and upper fingers on the inner points 11 co-act in unison on the stalks, and therefore the fingers 21 are pivotally secured to the chain 34 so that as each such finger turns about sprocket 32 at the end of the guide or track 35 each finger in engagement with a stalk will be caused to pivot thereby as it is being released, as indicated by finger 21', Fig. 4, so that said finger will quickly turn away and free the stalk, and as such finger continues its travel around the divider member 36 it will gradually assume proper position in relation to the chain run and be guided and adjusted between the covers or binders, at 40, as indicated in Fig. 6, in which manner the varying degrees of gradual adjustment of the fingers as shown in Fig. 4 will be apparent. By the instant or sudden escape of a finger from engagement with a stalk after it passes the end of guide 35 as indicated at 21' the remainder of the stalk-way between the rolls is free from other elements, and, as the machine progresses, the rear ends of the rolls pass astride the stalks, which are held in upright position by the walls 19'' of shield 19, and which stalks then become confined in the passageway formed by the frame and deflector 49 by which they are bent or caused to lean forwardly, and by their inherent springy character regain their normal standing position as the passageway departs from and releases the stalks. Meantime the snapped ears lodging on the snapping and husking rolls are being husked thereby and discharging into the auger with broken stalks, leaves and trash through the space 73' beneath the wall 19'' of shield 19 and the mass of material augered into the housing 77 and onto the carrier 78, which latter conveys and discharges the material across the mouth of the fan outlet 85, the blast from which winnows the material, so that the stalk pieces and light matter are blown rearwardly to the ground while the heavy husked and cleaned ears fall into the elevator C, all as indicated in Figs. 10 and 11, to be delivered into a vehicle D, as shown in Fig. 2, or otherwise. Under conditions where the wind is in the direction of travel of the harvester, that is, blowing against the rear end thereof, portions of the light material discharging into the path of the fan blast will be carried around the sides of the fan casing by the wind and drawn into the openings 90 by the suction of the fan, and therefore I provide the series of gates 86 in the fan outlet 85, which are inclined as shown in Fig. 12 and of a height at their outer ends, Fig. 11, so as to be spaced from the upper side of outlet 85. By employing the gates 86, Fig. 10, the material withdrawn into the fan and discharging therefrom under the condition stated will ride between the gates and along the inclined edges thereof and pass out through the outlet as shown in Fig. 11 to be blown away; and it will be understood also that the heavy ears are prevented from entering the fan outlet when striking the outer ends of the gates, which may otherwise occur when tossed from the conveyer 78 and thus choke or cause damage to the fan structure.

As is understood, a corn harvester is subjected to unusually rough usage, at times under unfavorable weather and land conditions, and is operated for maximum capacity and speed where tractor power is employed, so that breakage or damage of some of its actuating elements is liable for various reasons, a common cause being the clogging and jamming of the snapping rolls by the stalks, ears, or foreign material such as stones and the like. Therefore, in connection with the roll actuating shafts 54 I employ suitable jump clutches with the sprockets 56, Fig. 14, of well known construction, by which safety devices, when the rolls or chains cease to rotate from clogging or other cause, the clutch member 56' forming part of sprocket 56 will withdraw from clutching operation with its opposed member 55' fixedly secured to shaft 54 and compress spring 54', and as clutch sprocket 56 is mounted to run freely it will be understood that the rolls 50, 51, and chains associated therewith will remain non-rotatable until freed from obstruction, at which moment spring 54' distends and causes member 56' to engage member 55', and as the latter is fixedly secured to shaft 54 said shaft will resume rotation the instant said clutch members become engaged, and consequently the roll and chain assembly will be accordingly driven. While I have shown such safety devices in connection with shafts 54 it will be understood that substantially similar devices may also be applied to one or more of the gear assembly associated with the rolls and any of the gear driving parts associated therewith. In Fig. 14 it will be noted that considerable distance exists between the driving system 56 and the driven gear system 60, 63, which is of importance and advantage in a machine of the character disclosed, as the strain between the systems is minimized and balanced and breakage of parts obviated, whereas should the driving system be positioned closely adjacent the driven system such rigidity of the engagement between the parts would be established as to subject them to undue strain and breakage.

I claim as my invention:

1. In a corn harvesting machine, the combination of a pair of gathering points, snapping rolls positioned between the points, a gathering chain mounted in one of the points said chain having fingers, a gathering chain in the opposite point having fingers, a lower chain on said latter gathering point including pivotally mounted fingers, means for actuating said rolls and chains to gather standing stalks and remove the ears therefrom, means for receiving and conveying ears and lighter material discharging from the rolls, and means for receiving the ears and other material from said conveying means and discharging the same into an air blast for separating light material from the ears.

2. In a corn harvesting machine, the combination of a pair of gathering points, snapping rolls positioned between the points, a gathering chain mounted in one of the points said chain having fingers, an upper chain shaft in the opposite point having fingers, a lower chain in said latter point having pivotally mounted fingers, a guide through which said lower chain travels and by which the fingers thereon are maintained at right angles to the chain while traveling adjacent a roll, means at the rear end of the guide about which the chain turns and by which said pivoted fingers are freed from stalks after passing the end of said guide, and means for conveying detached stalks and other material from the machine.

3. In a corn harvesting machine, the combination with an inner and an outer gathering point, of a gathering chain having fingers thereon mounted on one of said points, a gathering chain having fingers mounted on the opposite point, a divider embodying a guide and positioned longitudinally of said latter point, a sprocket adjacent the rear and the forward ends of the divider, a chain connecting said sprockets, and fingers pivotally mounted on said latter chain and adapted to travel in relation to the guide at right angles to said chain whereby stalks are engaged and guided between the rolls and said pivoted fingers disengaged from the stalks when passing around said rear sprocket.

4. In a corn harvesting machine, the combination with an inner and an outer gathering point, of snapping rolls between said points, a container adjacent said rolls, a deflector between said rolls and the container whereby husked ears and other material are delivered into the container, an auger in the container for conveying material rearwardly through the container, cutting means associated with the container for severing stalks into short lengths to be conveyed from the container by the auger, and a conveyer communicating with said container for receiving material therefrom and conveying the same from the machine.

5. In a corn harvesting machine, the combination, with stalk gathering means, of means for removing ears from the stalks, means for conveying the ears and other material from the machine, and means for cutting detached stalks into short portions to be conveyed with said material.

6. In a corn harvesting machine, means for gathering stalks, means for picking the ears therefrom, a conveyer for removing the ears and other material from the machine, and a knife associated with the conveyer for cutting loose stalks into suitable lengths to be received in and removed with said ears and material.

7. In a corn harvesting machine, means for gathering stalks, means for picking the ears therefrom, a conveyer for removing ears and other material from the machine, means for cutting detached stalks into suitable lengths to be received and moved by said conveyer, a carrier communicating with the conveyer for receiving and conveying the material therefrom, a fan adapted to discharge an air blast through the material discharging from said carrier, and means for simultaneously actuating said stalk gathering and picking means, conveyer, carrier, and fan, to remove ears from stalks, husk and separate the ears from other material, and discharge such ears and material from the machine.

8. In a corn harvesting machine, means for gathering stalks, means for picking the ears therefrom, a container for receiving the ears and trash, a conveyer in the container for removing the material therefrom, and means for cutting detached stalks into suitable lengths to be received in and conveyed by said conveyer with other material.

9. In combination with a corn harvesting machine having a frame, means supported thereby for gathering stalks, means for picking ears from the stalks, means for husking the ears, a conveying system for receiving the husked ears and trash and delivering the same from the machine, a fan supported by the frame including an outlet having means therein whereby material entering the fan may be discharged through said means and the latter also preventing the entrance of ears into the outlet, and means for simultaneously actuating said husking means, conveyer and fan whereby the latter also discharges its blast through the material being conveyed.

10. In combination with a corn harvesting machine having a frame, means supported thereby for gathering stalks, means for picking ears from the stalks, means for husking the ears, a conveying system for receiving the husked ears and trash and delivering the same from the machine, a fan supported by the frame having an outlet including a plurality of passageways about which material and air are discharged into material being delivered from the conveyer, and means for simultaneously actuating said husking means, conveyer and fan for the purposes set forth.

11. In combination with a corn harvesting machine having a frame, a plurality of pairs of gathering points supported thereby, pairs of snapping rolls between each pair of said points, and an auger conveyer between the pairs of rolls for delivering husked ears and trash from the machine.

12. In combination with a corn harvesting machine having a frame, a plurality of pairs of gathering points supported thereby, pairs of snapping rolls between each pair of said points, an auger conveyer between the pairs of rolls, and cutting means in the path of material conveyed by the auger for severing detached stalks into lengths to be received in and conveyed with other material by the conveyer.

13. In combination with a corn harvesting machine having a frame, a plurality of pairs of gathering points supported thereby, pairs of snapping rolls between each pair of said points, an auger conveyer between the pairs of rolls, cutting means in the path of material conveyed by the auger for severing detached stalks into lengths to be received in and conveyed with other material by the conveyer, and means for winnowing the conveyed material to separate the husked ears from trash.

14. In a corn harvesting machine having a frame and operated from tractor power, the combination of stalk gathering means supported by the frame, means for removing ears from the stalks, an auger conveyor for conveying ears and other material from the machine, means associated with the conveyor for cutting detached stalks, means for winnowing the conveyed material to separate the ears therefrom, means for actuating said gathering, ear removing, conveying and winnowing means simultaneously, and a power shaft connected to a tractor and to said actuating means for driving the latter.

15. In a corn harvesting machine having a frame and operated from tractor power, the combination of stalk gathering means supported by the frame, means associated with the gathering means for removing ears from stalks, means for conveying ears and other material from the machine, a sprocket-and-chain system for simultaneously actuating said gathering, ear removing and conveying means, and means associated with said actuating means for discontinuing the operation of said gathering, ear removing and conveying means and whereby said latter plurality of means may be caused to resume operation.

16. In a corn harvester, means for gathering corn stalks and removing the ears therefrom, means for conveying the ears and trash from the machine, and a knife positioned transversely of the conveying means for intercepting and severing stalks into short lengths.

17. In a corn harvester, means for removing ears from stalks, an auger conveyer for receiving and removing the ears and trash from the machine, and means cooperating with the auger for cutting stalks into short lengths while being conveyed.

18. In a corn harvesting machine, means for gathering corn stalks and removing ears therefrom, a conveyer for receiving and removing the ears and trash from the machine, and a curved knife cooperating with the conveyer for severing stalks into short lengths.

19. In a corn harvesting machine having a main frame, the combination of stalk gathering and ear removing mechanisms mounted on the frame, shafts for actuating said mechanisms, vertical members associated with the main frame, a bearing plate connecting said members to form passageway for stalks, means for mounting said shafts in the bearing plate, and means for rotating the shafts to actuate said mechanisms whereby as the gathering and ear removing elements thereof and the passageway pass astride standing stalks the latter will be released to resume normal position.

20. In a corn harvesting machine having snapping rolls, and a gathering chain adjacent and cooperating with the rolls said chain having fingers pivotally mounted thereon.

21. In a corn harvesting machine having snapping rolls, a gathering chain adjacent and cooperating with the rolls, a finger on the chain comprising a base and flanged side walls, and means for pivotally mounting the finger on the chain.

22. In combination with a corn harvesting machine having a frame, gathering points supported thereby, a pair of snapping rolls between the points adapted to pass astride standing stalks, and an open stalkway associated with the frame comprising an arched frame supported on cross members adapted to pass astride the stalks.

23. In a corn harvesting machine having a frame, the combination of stalk gathering and ear removing mechanism mounted on the frame, shafts for actuating said mechanisms, spaced vertical members mounted on the frame, a bearing plate connecting said members to form a stalkway, means for mounting said shafts in the plate, and means for rotating the shafts to actuate said mechanisms whereby as the gathering and ear removing elements thereof and the stalkway pass astride standing stalks the latter will be released to resume normal position.

NORMAN R. KRAUSE.